(No Model.)
J. PICKRELL.
DUMPING CART.
No. 598,390. Patented Feb. 1, 1898.
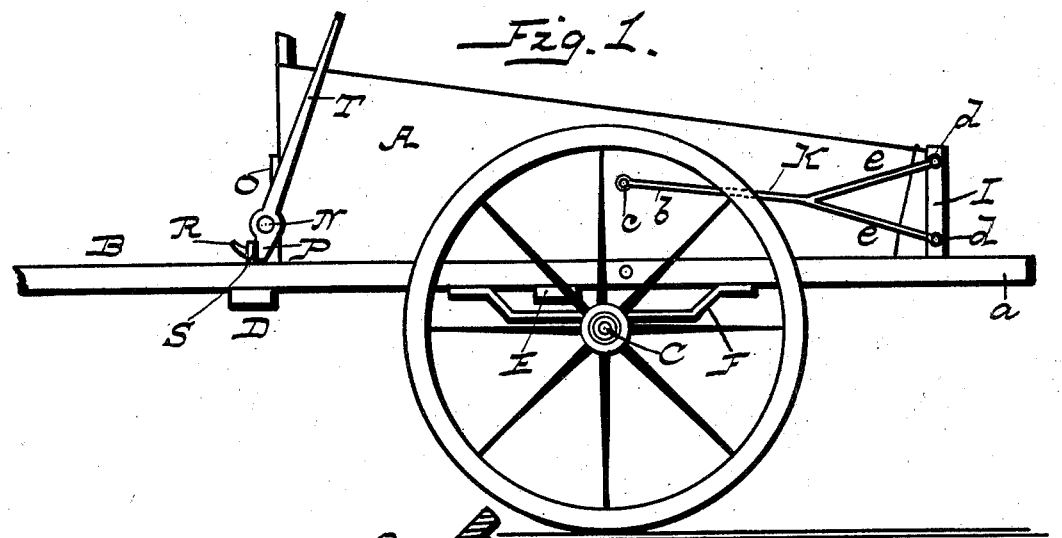
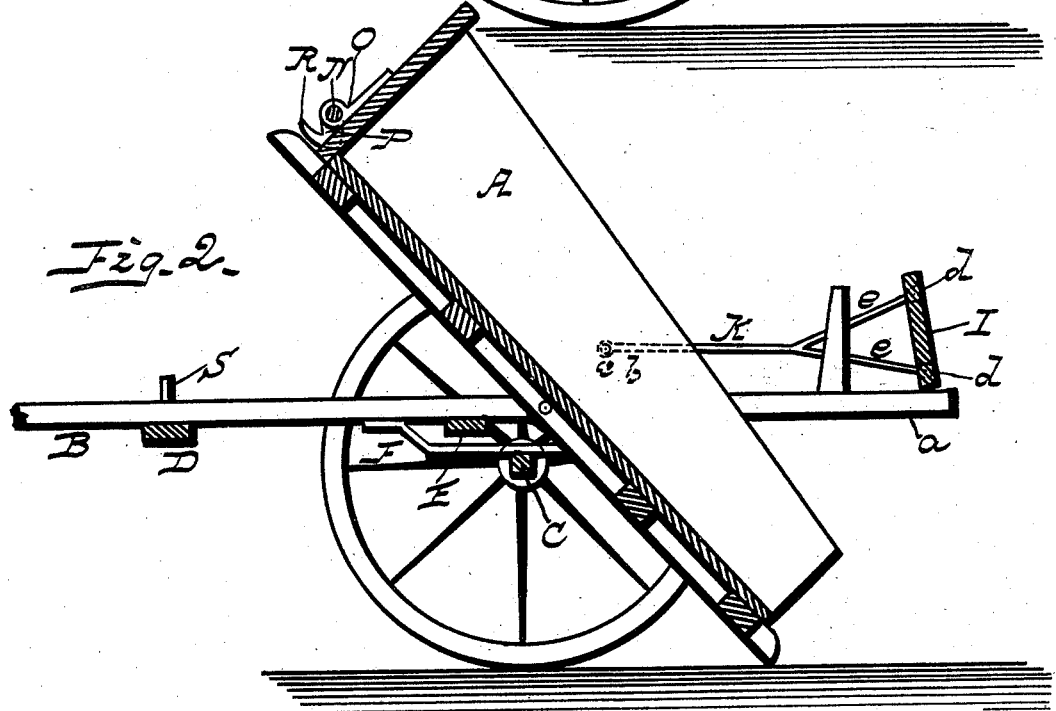
WITNESSES: Jas. B. Clarke, M. M. Morton
INVENTOR: John Pickrell
by E. H. Bates, Attorney

United States Patent Office.

JOHN PICKRELL, OF LOUISVILLE, KENTUCKY.

DUMPING-CART.

SPECIFICATION forming part of Letters Patent No. 598,390, dated February 1, 1898.

Application filed July 24, 1897. Serial No. 645,773. (No model.)

*To all whom it may concern:*

Be it known that I, JOHN PICKRELL, a citizen of the United States, residing at Louisville, in the county of Jefferson and State of Kentucky, have invented certain new and useful Improvements in Dumping-Carts and Dumping-Wagons; and I do hereby declare the following to be a full, clear, and exact description of the invention, such as will enable others skilled in the art to which it appertains to make and use the same.

This invention has relation to improvements in dumping carts and wagons; and it consists in the novel construction and arrangement of parts of which it is composed, all as will be hereinafter fully described and particularly pointed out in the appended claims.

The annexed drawings, to which reference is made, fully illustrate my invention, in which—

Figure 1 represents a side view of my improved dumping-cart, showing the same in its normal position. Fig. 2 is a vertical sectional view showing the cart in a dumping position.

Referring by letter to the accompanying drawings, A designates the body of the cart, and B B are the shafts thereof, which latter extend rearwardly and beyond the axle C and somewhat beyond the rear of the cart-body for a purpose presently explained. These shafts are connected by a front transverse bar D and an intermediate cross-bar E near the axle, which latter is connected to bars or springs F, that are secured at their ends to the shafts, as shown in Figs. 1 and 2 of the annexed drawings.

At the front portion of the cart is a transverse rod N, pivoted in bearings O, secured to said cart, and the same is provided with downwardly-projecting arms P P, having hooks R R, that engage staples S S on the upper face of the shafts and in front of the cart-body. A hand-lever T is secured to the transverse rod, whereby the hooks are caused to engage and disengage the said staples in locking and unlocking the cart-body from the shafts.

I represents the end-gate of the cart, which is supported in a vertical position upon the projecting ends $a$ $a$ of the shafts, upon which it slides while the cart is tilting.

K indicates a Y-shaped rod, the end $b$ of which is pivoted at $c$ to the side of the cart, while the forked ends $e$ $e$ are each secured at $d$ $d$ to the end of the gate.

It will be observed from the above description, when taken in connection with the annexed drawings, that in dumping the cart the operator thrusts the lever forward, when the hooks will disengage from the staples and the forward end of the cart is raised, tilting the body, and at the same time the end-gate slides rearwardly upon the extensions of the shafts through the medium of the Y-shaped rods turning at their pivoted front ends, each rod forcing the gate rearwardly as the body of the cart is dumped, thus removing the end-gate sufficiently rearward and permitting the contents thereof to escape from the body clear of any obstruction and the operator does not at any time handle the end board or gate.

In bringing the body down upon the shafts the operator simply forces the front end of the body down and locks the same to the shafts by forcing the hand-lever rearwardly, when the hooks will engage the staples and lock the body and shafts to one another. At the same time the downward movement of the cart-body causes the pivoted side rods to draw the end-gate forward and against the rear of the cart-body, the body and gate moving simultaneously with one another.

It is obvious that my device can be applied to dumping-wagons as well as dumping-carts, and a device as herein described and shown is simple in operation, durable, and the end-gate cannot be misplaced or lost, and at the same time is cheap to manufacture.

Having thus described my invention, what I claim, and desire to secure by Letters Patent, is—

1. The within-described end-gate, comprising the gate I, and forked rods, the forward ends thereof pivoted to the sides of the body and the rear ends secured to the ends of the gate, said gate adapted to slide back and forth upon the extended ends of the shafts, by the movement of the cart-body, in dumping the same and forcing it afterward back to its normal position, substantially as described.

2. In combination with the rearwardly-extended shafts, said shaft extensions providing slideways for the end-gate, of the Y-shaped rods K, K, the forward end pivoted to the sides of the cart-body and the rear forked ends secured to the end-gate, substantially as described.

In testimony whereof I affix my signature in presence of two witnesses.

JNO. PICKRELL.

Witnesses:
RUTH McCARTHY,
JOHN G. WOODBURY.